3,019,200
PREPARATION OF CELLULAR POLYESTER ORGANIC POLYISOCYANATE REACTION PRODUCT USING AMIDE CATALYST
Eric Gee, Herbert Gudgeon, and Kenneth Stephenson, Manchester, England, assignors to Imperial Chemical Industries Limited, London, England, a corporation of Great Britain
No Drawing. Filed Nov. 29, 1956, Ser. No. 624,986
Claims priority, application Great Britain Dec. 1, 1955
2 Claims. (Cl. 260—2.5)

This invention relates to improvements in or relating to the manufacture of polymeric materials from polyesters and organic polisocyanates.

It has already been proposed, for example in British Patent No. 553,733, to manufacture polymeric materials by interacting polyesters and organic polyisocyanates, optionally in the presence of catalysts. It has also been proposed to modify the reaction by appropriate choice of starting materials or by addition of water in order to produce blown, cellular materials. As catalysts in these processes there have been proposed tertiary amines free from any groups reactive towards isocyanates. Such tertiary amines do not themselves react with the isocyanate and so they are only retained mechanically in the final product.

Since most of the tertiary amines available for use in this manner are liquids, and many of these are volatile and malodorous, the final product frequently possesses an objectionable odour. Furthermore the amine may subsequently migrate from the product on to the neighbouring materials with possible undesirable results.

We have now found that, by the use as catalysts of tertiary amines containing groups which are reactive towards isocyanates, there may be obtained products which are free from such disadvantages.

Surprisingly, however, it is not necessary that the group reactive towards isocyanates should react under the conditions of the foaming reaction. Thus, for example amide and mono-substituted amido groups are known to be able to react with isocyanates, but tertiary amines containing these groups can be extracted substantially completely from the final foamed polymeric material by simple extraction with a solvent such as benzene, thus demonstrating that substantially no reaction has taken place between the amido or mono-substituted amido group and the isocyanate used in the preparation of the foam. Likewise the hydroxyl group is known to be reactive towards isocyanates but in the case of 2:4:6-tris-(dimethylaminomethyl)-phenol no such reaction takes place during the foaming reaction.

Thus according to our invention we provide an improved process for the manufacture of polymeric materials by the catalytic reaction of polyesters with organic polyisocyanates characterised in that there is used as catalyst a tertiary amine containing at least one group which is reactive towards isocyanates.

As groups which are reactive towards isocyanates there may be mentioned for example hydroxyl (including alcoholic and phenolic types), primary and secondary amino and ureido groups, and preferably amido and mono-substituted amido groups.

It is preferred to use tertiary amines wherein the tertiary nitrogen atom is linked to three carbon atoms of which none carries a double bond, for example to three aliphatic or cycloaliphatic radicals. It is also desirable but not essential that the tertiary amine should be chemically stable when mixed with water, with or without an emulsifying agent, so that it is advantageous that the tertiary amine should be free from any groups which may be readily hydrolysed under such conditions, for example ester groups.

As examples of tertiary amines which may be used in the process of this invention there may be mentioned 2-diethylaminoethylamine, 2-diethylaminoethanol, N-(2-diethylaminoethyl)-benzamide, N-(2-diethylaminoethyl)-acetamide, N-(3-diethylaminopropyl)-acetamide, β-diethylamino-propionamide and triethanolamine. There may also be used tertiary amines which contain more than one tertiary nitrogen atom, for example bis-(diethylaminoethyl)-amine and 2:4:6-tris-(dimethylaminomethyl)-phenol.

The polyesters for use in the process of our invention have been described in the prior art. In particular, the polyesters used may advantageously be those prepared from ingredients comprising from 2 to 18 molar percentage, based on the total dicarboxylic acid incorporated, of at least one compound containing more than two isocyanate reactive groups for example pentaerythritol, as is more fully described in British Patent 790,420.

Suitable polyisocyanates for use in the process of our invention include particularly toluylene-2:4-diisocyanate, mixtures of toluylene-2:4- and 2:6-diisocyanates, and diphenylmethane-diisocyanates.

The incorporation of the tertiary amine into the polyester and polyisocyanate may be carried out in a continuous or discontinuous manner, for example by the continuous process described in U.S. application Serial No. 568,999, now abandoned, and the ingredients may be mixed in any order.

The rate of "blowing" and "curing" of the mixture varies with the amount of tertiary amine used and also with the particular amine employed.

The "bulk density" of the products may be varied by increasing or decreasing the amount of water added, and varying the amount of polyisocyanate accordingly. The structure may be varied by the addition of other materials, for example iron compounds and organopolysiloxanes.

Fillers, colouring matters, flame-proofing agents or other materials, preferably not reactive towards isocyanates, may be added to the mixture at an appropriate stage. They may be added as dry powders or as premixed pastes with, for example, the polyester or the polyisocyanate or with tricresyl phosphate or water.

The invention is illustrated but not limited by the following examples in which the parts are by weight.

*Example 1*

50 parts of a copolyester, prepared from diethylene glycol, pentaerythritol and adipic acid with a hydroxy number of 66.7 and an acid number of 5.0, are stirred at room temperature with 15.4 parts of a 2:1 mixture of toluylene-2:4- and 2:6-diisocyanates. A mixture of 1.5 parts of N-(2-diethylaminoethyl)-benzamide, 1 part of an emulsifying agent (obtained by mixing 13 parts of diethylamine and 87 parts of oleic acid) and 1 part of water is added and stirred in rapidly until thoroughly mixed. The still fluid material is poured into a mould and allowed to stand at room temperature. The product, which is cured within 30 minutes, is a fine-pored resilient cellular material free from amine odour.

*Example 2*

50 parts of a liquid copolymer, prepared by reacting 228 parts of adipic acid with 177 parts of diethylene glycol and 8.16 parts of pentaerythritol and having a hydroxyl value of 66.7 mg. KOH per gram and an acid value of 5.0 mg. KOH per gram, are stirred at room temperature with 15.4 parts of a 2:1 mixture of toluylene-2:4- and 2:6-diisocyanates. A solution of 0.43 part of 2-diethylaminoethanol in 1 part of water is added and stirred in rapidly until thoroughly mixed. The still fluid material is poured into a mould and allowed to stand at room temperature. The cured product, which can be removed from the mould within 30 minutes, is a resilient cellular material free from amine odour.

*Example 3*

50 parts of a liquid copolymer, prepared by reacting 1716 parts of glutaric acid with 1465 parts of diethylene glycol and 92 parts of pentaerythritol and having a hydroxyl value of 73.7 mg. KOH/gm. and an acid value of 1.5 mg. KOH per gram, are stirred at room temperature with 16.0 parts of a 4:1 mixture of toluylene-2:4- and 2:6-diisocyanates. A mixture of 0.1 part of 2-diethylaminoethanol, 1 part of water and 1 part of the condensation product of octyl phenol with 10 mols. of ethylene oxide is added and stirred in rapidly until thoroughly mixed. The still fluid material is poured into a mould and allowed to stand at room temperature. The cured product, when removed from the mould, is a resilient cellular material free from amine odour.

*Example 4*

A mixture of 50 parts of the diethylene glycol/pentaerythritol adipate copolymer described in Example 1 and 15.4 parts of a 2:1 mixture of toluylene-2:4- and 2:6-diisocyanates is stirred rapidly at room temperature. To this mixture is added an activator mix consisting of 1 part of N-(2-diethylaminoethyl)acetamide, 1 part of water and 0.75 part of the condensation product of octyl phenol with 10 mols. of ethylene oxide. The mixture begins to foam within 30 seconds and after 30 minutes a resilient cellular product is obtained which is free from amine odour.

N-(2-diethylaminoethyl)acetamide may be prepared by heating 69.6 parts of β-diethylaminoethylamine with 30.6 parts of acetic anhydride and removing the water of reaction by azeotropic distillation with toluene. The reaction product, after removal of toluene, is fractionally distilled, the fraction boiling at 149–152° C. at a pressure of 23 mm. Hg being collected.

*Example 5*

50 parts of the copolymer described in Example 1 are stirred at room temperature with 15.4 parts of a 4:1 mixture of toluylene-2:4- and 2:6-diisocyanates. A mixture of 0.2 part of N-(2-diethylaminoethyl)-acetamide, 1 part of water and 1 part of the condensation product of octyl phenol with 10 mols. of ethylene oxide is added and the stirring is continued. The still fluid material is then poured into a mould and allowed to stand at room temperature. No amine odour can be detected in the resultant resilient cellular product.

N-(2-diethylaminoethyl)acetamide may be prepared as described in Example 4.

*Example 6*

50 parts of a liquid polyester, prepared by reacting 1898 parts of adipic acid with 1515 parts of diethylene glycol and having a hydroxy value of 45.0 mg. KOH per gram and an acid value of 3.5 mg. KOH per gram, are stirred at room temperature with 13.9 parts of a 2:1 mixture of toluylene-2:4 and 2:6-diisocyanates. To this mixture is added an activator mix consisting of 1.5 parts of N-(2-diethylaminoethyl-benzamide, 1 part of an emulsifying agent (obtained by mixing 13 parts of diethylamine and 87 parts of oleic acid) and 1 part of water. The foaming mixture is poured into a mould and allowed to stand at room temperature. The resilient foam product is free from amine odour.

N-(2-diethylaminoethyl)benzamide may be prepared according to the method described in French Patent No. 805,377.

*Example 7*

50 parts of the diethylene glycol/pentaerythritol adipate copolymer described in Example 1 are stirred at room temperature with 15.4 parts of a 2:1 mixture of toluylene-2:4- and 2:6-diisocyanates. A mixture of 0.5 parts of N-(3-diethylaminopropyl)acetamide, 1 part of water and 0.75 part of the condensation product of octyl phenol with 10 mols. of ethylene oxide is added and stirred in thoroughly, and the resulting foaming mixture is poured into a mould. The cured product, which can be removed from the mould within 30 minutes, is a fine-pored cellular material free from amine odour.

N-(3-diethylaminopropyl)acetamide may be prepared by heating 55.5 part of 3-diethylaminopropylamine with 21.7 parts of acetic anhydride and removing the water of reaction by azeotropic distillation with toluene. The reaction product, after removal of toluene, is fractionally distilled, the fraction boiling at 112–113° C. at a pressure of 0.1 mm. Hg being collected.

*Example 8*

50 parts of the diethylene glycol/pentaerythritol glutarate copolymer described in Example 3 are stirred at room temperature with 16.0 parts of a 2:1 mixture of toluylene-2:4- and 2:6-diisocyanates. A mixture of 0.5 part of N-(3-diethylaminopropyl)-acetamide, 1 part of water and 0.75 part of the condensation porduct of octyl phenol with 10 mols. of ethylene oxide is added and stirred in rapidly until thoroughly mixed. The still fluid material is poured into a mould and allowed to stand at room temperature. No amine odour can be detected in the resultant resilient cellular product.

N-(3-diethylaminopropyl)-acetamide may be prepared as described in Example 7.

*Example 9*

50 parts of the diethylene glycol/pentaerythritol adipate copolymer described in Example 1 are stirred at room temperature with 15.4 parts of a 2:1 mixture of toluylene-2:4- and 2:6-diisocyanates. To this mixture is added an activator consisting of 1.25 parts of β-diethylaminopropionamide, 1 part of water and 1 part of an emulsifying agent (obtained by mixing 13 parts of diethylamine and 87 parts of oleic acid). The foaming mixture is poured into a mould and allowed to stand at room temperature. After 30 minutes the resilient cellular product, which possesses no amine odour, can be removed from the mould.

β-diethylaminopropionamide may be prepared by mixing 44 parts of diethylamine and 35.5 parts of acrylamide and warming the mixture to initiate the exothermic reaction. The excess diethylamine is removed and the reaction product is fractionally distilled, the fraction boiling at 93–94° C. at a pressure of 0.1 mm. Hg being collected.

*Example 10*

50 parts of the diethylene glycol/pentaerythritol/adipate copolymer described in Example 1 are stirred at room temperature with 15.4 parts of a 2:1 mixture of toluylene-2:4- and 2:6-diisocyanates. To this mixture is added an activator mix consisting of 0.75 part of 2-diethylaminoethylamine, 1 part of water and 1 part of the condensation product of octyl phenol with 10 mols of ethylene oxide. Stirring is continued and then the mixture while still fluid is poured into a mould and allowed to stand at room temperature. The resilient cellular product, which is free from odour, can be removed from the mould within 30 minutes.

*Example 11*

A mixture of 50 parts of the diethylene glycol/pentaerythritol adipate copolymer described in Example 1 and 15.4 parts of a 2:1 mixture of toluylene-2:4- and 2:6-diisocyanates is stirred rapidly at room temperature. A solution of 0.6 part of bis-(2-diethylaminoethyl)-amine in 1 part of water is added and stirred in thoroughly. The foaming mixture is poured into a mould and allowed to stand at room temperature. The fine-pored resilient cellular product, which can be removed from the mould within 30 minutes, is free from amine odour.

Example 12

50 parts of the diethylene glycol/pentaerythritol adipate copolymer described in Example 1 are stirred at room temperature with 15.4 parts of a 2:1 mixture of toluylene-2:4- and 2:6-diisocyanates. To this mixture is added an activator mix consisting of 0.4 part of 2:4:6-tris-(dimethylaminomethyl)phenol, 1 part of water and 0.5 part of the condensate of octyl phenol with 10 mols. of ethylene oxide, and the stirring is continued. The still fluid mixture is poured into a mould and allowed to stand at room temperature. The cellular product, which is highly resilient and free from amine odour, can be removed from the mould within 30 minutes.

Example 13

50 parts of a polyester prepared from diethylene glycol, pentaerythritol and adipic acid and having a hydroxyl value of 65.9 mg. KOH/gram and an acid value of 5.0 mg. KOH/gram were stirred at room temperature with 15.2 parts of a 2:1 mixture of toluylene-2:4- and 2:6-diisocyanates. A mixture of 1 part of β-diethylaminopropionamide and 1 part of water was added and stirred in rapidly until thoroughly mixed. The foaming mixture was poured into a mould and allowed to stand at room temperature. After 30 minutes the foamed product was cured and could be removed from the mould.

A piece of the foamed product so prepared was extracted with benzene for 2 hours in a Soxhlet extraction apparatus. A small volume of water was added to the extract which was then titrated with decinormal hydrochloric acid using methyl orange as indicator. The titration showed that substantially the whole of the β-diethylaminopropionamide had been extracted from the foam.

Example 14

50 parts of the polyester described in Example 13 were stirred with 16.0 parts of a 2:1 mixture of toluylene-2:4- and 2:6-diisocyanates. A mixture of 1 part of β-diethylaminopropionamide and 1 part of water was added and thoroughly stirred in. The still fluid mixture was poured into a mould and allowed to stand at room temperature. After 30 minutes the foamed product was cured and could be removed from the mould.

A piece of the foamed product was extracted with benzene and the extract treated as described in Example 13. The result indicated that substantially the whole of the β-diethylaminopropionamide had been extracted from the foam.

What we claim is:

1. In the process of preparing a cellular polyurethane product produced by mixing a hydroxyl polyester with an organic polyisocyanate and water, said polyester being prepared by reacting a dihydric alcohol, a trihydric alcohol and a dicarboxylic acid, the improvement which comprises incorporating therein prior to the formation of a cellular product, a catalyst selected from the group consisting of N-(2-diethylaminoethyl)-benzamide, N-(2-diethylaminoethyl)-acetamide, N-(3-diethylaminopropyl)-acetamide and 3-diethylamino-propionamide.

2. In the process of preparing a cellular polyurethane product produced by mixing a hydroxyl polyester with toluene diisocyanate and water, said polyester being prepared by reacting a dihydric alcohol, a trihydric alcohol and a dicarboxylic acid, the improvement which comprises incorporating therein prior to the formation of a cellular product 3-diethylaminopropionamide as a catalyst.

References Cited in the file of this patent

UNITED STATES PATENTS

| 2,764,565 | Hoppe et al. | Sept. 25, 1956 |

FOREIGN PATENTS

| 712,053 | Great Britain | July 14, 1954 |
| 1,106,525 | France | July 20, 1955 |